United States Patent [19]

Rodrigue et al.

[11] Patent Number: 4,609,318

[45] Date of Patent: Sep. 2, 1986

[54] ROTARY PILER SYSTEM FOR SUGAR CANE

[75] Inventors: Kenneth J. Rodrigue; Joe G. Worlow, both of Thibodaux, La.

[73] Assignee: Cameco Industries, Inc., Thibodaux, La.

[21] Appl. No.: 662,764

[22] Filed: Oct. 19, 1984

[51] Int. Cl.⁴ ............................................. A01D 59/00
[52] U.S. Cl. ..................................... 414/132; 56/16.1; 414/786
[58] Field of Search .................. 414/28, 29, 132, 745, 414/786; 56/13.9, 16.1, DIG. 21; 198/308, 518

[56] References Cited

U.S. PATENT DOCUMENTS

| | | | |
|---|---|---|---|
| 2,375,205 | 5/1945 | Barras | 414/560 |
| 2,559,862 | 7/1951 | Ferguson | 56/DIG. 21 |
| 2,674,380 | 4/1954 | Boudreaux | 414/132 |
| 2,833,429 | 5/1958 | Shoemaker | 414/132 X |
| 2,874,854 | 2/1959 | Thornton | 414/132 |

Primary Examiner—Leslie J. Paperner
Attorney, Agent, or Firm—C. Emmett Pugh

[57] ABSTRACT

A sugar cane piler system comprising a standard push piler with attached, rotating, multipointed star wheels which rotate about fixed but adjustable points. The rotary piler assists in rolling the cane in front of the push piler and dislodges dirt, mud, and other foreign matter from the cane in the heap row being push-piled for loading. Also, by increasing the rolling action of the pushed pile, a large pile of cane can be pushed for a fuller grab in the loading operation.

17 Claims, 2 Drawing Figures

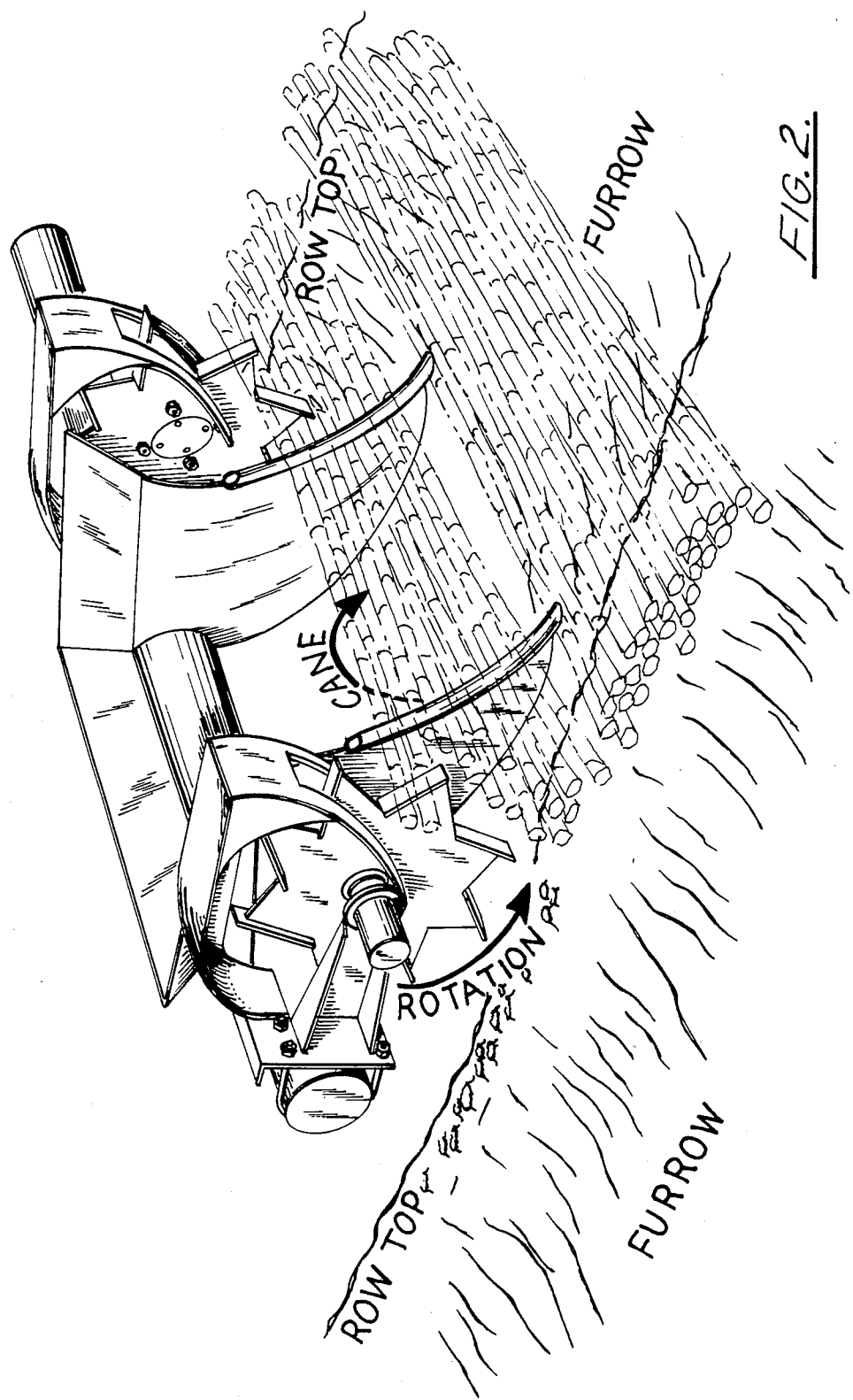

ROTARY PILER SYSTEM FOR SUGAR CANE

BACKGROUND OF INVENTION

1. Field of Invention

The present invention relates to an attachment to a sugar cane loader push piler which comprises for example a pair of rotating, multipointed, star wheels mounted on the outsides of the piler to assist in the rolling up of the pile and to dislodge unwanted foreign matter from the pile.

2. Prior Art

The prior art in general comprises the currently widely accepted fixed shape pilers that have no moving parts to its piling elements. They usually include two or more essentially vertical plates cut with points or tips on the bottom and a parabolic or eliptical curve. The leading edge of the piler teeth are often reinforced with a round section as a wear strip and to reduce abuse of the cane.

Mechanical pilers have been tried in the past but have not been successful or widely accepted. They include two general types: (a) chain pilers; and (b) oscillating bar pilers. The chain pilers used two or more sprockets or sheaves and a chain with fingers or stickers. The chain was routed so that part of its path was along the leading edge of the push piler with its fingers or stickers towards the cane. The leading edge of the chain moved upward and the cane was rolled. Exemplary of this first, chain piler type is the "Sugar Cane Piler" of U.S. Pat. No. 2,674,380 issued Apr. 6, 1954 to E. J. Boudreaux. The second type or oscillating bar piler type included a series of slats that were oscillated by cams to lift and roll the cane. Exemplary of the second, oscillating bar type is the "Can Piler" of U.S. Pat. No. 2,874,854 issued Feb. 24, 1959 to S. A. Thornton. Both of these types have proved to be high maintenance systems with lots of downtime.

3. General Discussion of the Invention

The present invention in its preferred embodiment comprises two clamp-on attachments to the existing push piler and an hydraulic system. The clamp-on attachments are designed to provide easy removal if they become inoperative. They can also be easily adjusted either up or down and/or either in or out to fit the rows in the field.

At least two multi-pointed starwheels are mounted, one at each end of the existing push piler, to the shaft of an added hydraulic motor. The hydraulic power for the two piler motors which are mounted in series, is from an adjustable flow divider, whose controlled output is controlled by linkage to be proportional with the loader's forward speed.

The rotary piler lifts and rolls the cane, and the slight beating action of the starwheels dislodge dirt, mud and other foreign matter.

BRIEF DESCRIPTION OF THE DRAWINGS

For a further understanding of the nature and objects of the present invention, reference should be had to the following detailed description, taken in conjunction with the accompanying drawings in which like parts are given like reference numerals and wherein:

FIG. 2 is a perspective, front view of the push piler, starwheel elements of the preferred embodiment of the present invention.

DETAILED DESCRIPTION OF THE PREFERRED EMBODIMENT(S)

Figure 1:
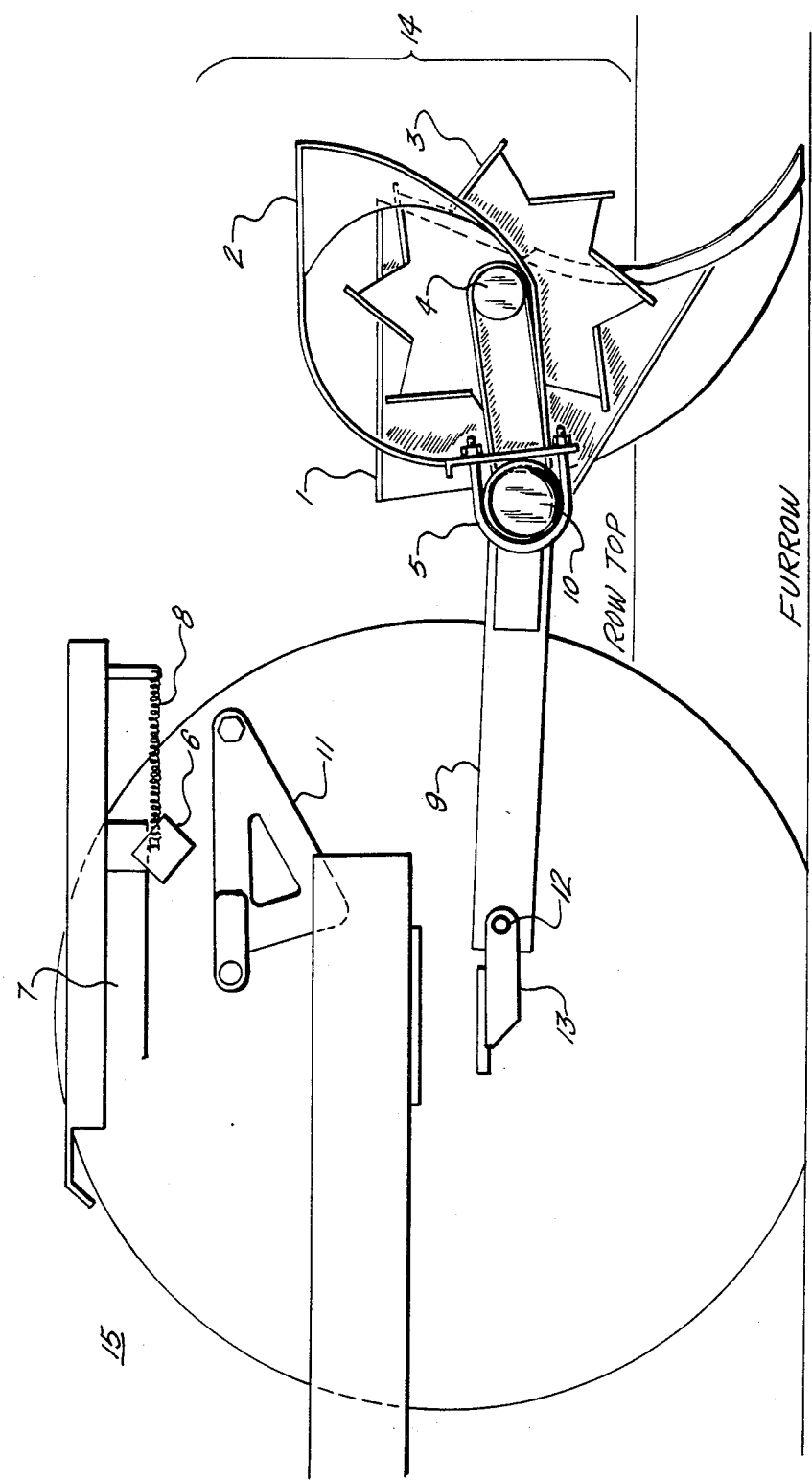
FIG. 1 is a side view showing in schematic form the front end of an exemplary loader with attached push piler having the preferred embodiment of the added rotable starwheels of the present invention.

In FIG. 1 a side view in schematic form of the front end of an exemplary, prior art loader 15 and its attached push piler 1 of the present invention is seen. The exemplary push piler 1 is connected to the loader by a piler tube 10, and the piler tube 10 is fixedly connected to arms 9. The arms 9 in turn are connected for pivotal movement to bracket 13 by pins 12. An hydraulic cylinder (not illustrated) is used to raise the piler 1 out of the row for transportation.

It is noted that the loader 15 is usually a wheeled vehicle with an hydraulic power supply on board. The piler 1 is usually fixedly attached by welding to the piler tube 10.

The rotary piler assemblies 14 of the present invention are clamped to the piler tube 10 by "U" bolts 5, which also can be used to vary the height and width or lateral spacing of the two rotary piler assemblies 14 for various row heights and widths.

Each starwheel assembly 3 of the rotary piler rotates so that the leading edge tips 16 rise up away from the furrow in the forward portion of the piler 1. The starwheels 3 are mounted and driven at a single point by hydraulic motors 4. An adjustable flow control valve 6 is added to the supply side of one of the loader's hydraulic circuits, and the level which controls the percentage of priority flow is interconnected to the loader's speed control pedal by linkage 7 and return spring 8. The linkage 7 is adjustable to set the desired ratio between ground speed and the rotary piler's revolutions per minute. It is usually desired to have the peripheral tip speed of the starwheels 3 be a little bit greater than ground speed, although great variation is possible.

As can also be seen in FIG. 2, each starwheel assembly 14 includes a protective upper housing 2 covering over most of the starwheel assembly 3. Each starwheel assembly 3 includes a vertically disposed, flat metal plate body 17 formed with star-like peripheral edges, upon which are fixedly mounted, transversely disposed, metal kicker plates 18.

The starwheel assemblies 3 are driven by the hydraulic motors 4 in a direction opposite to the direction of rotation of the loader wheels (note direction arrows in FIGS. 1 and 2). The peripheral, linear speed of the kicker plate edges 16 is preferably set to just exceed the ground speed of the loader 15, producing a light beating action on the cane pile, as it is being rolled up in the laterally spaced piler blades 20.

The rotary piler of the present invention lifts and rolls the cane, and the slight, beating action of the starwheels 3 dislodges dirt, mud and other foreign matter from the pile.

Because many varying and different embodiments may be made within the scope of the inventive concept herein taught, and because many modifications may be made in the embodiment(s) herein detailed in accordance with the descriptive requirements of the law, it is to be understood that the details herein are to be interpreted as illustrative and not in a limiting sense.

What is claimed is:

1. A piler system which push-piles sugar cane or the like for loading, comprising:

(a) a motorized vehicle used for loading sugar cane or the like having a frame; and
(b) piler means attached to said frame for push-piling and rolling the cane in front of said vehicle, said piler means including:
  (i) a push piler assembly, and
  (ii) at least two, spaced, rigid, rotatable, kicker wheel portions having laterally extended tips associated with said piler assembly, the rotation of said kicker wheel portions with the laterally extended tips hitting the cane causing a lifting and beating action on the cane as it is being push-piled to better form a large pile of cane and to dislodge dirt, mud, and other foreign matter from the pile of cane.

2. The system of claim 1, wherein said kicker wheel portions are comprised of two, separate kicker wheels, each one being mounted outboard on opposite sides of said push piler assembly.

3. The system of claim 1, wherein the rotational speed(s) of said kicker wheel portions is adjustable relative to the forward speed of said vehicle.

4. The system of claim 1, wherein said rotatable kicker wheel portions rotate about fixed but adjustable points.

5. The system of claim 1, wherein each of said kicker wheel portions comprises a rotating support body upon which are supported a series of laterally extending members.

6. The system of claim 1, wherein said kicker wheel portions are rotated in a direction opposite to the wheels of said vehicle and wherein the linear, peripheral speed of said kicker wheel portions is greater than the ground speed of said vehicle.

7. The system of claim 1, wherein there is further included speed control means associated with said kicker wheel portions and the speed control for the vehcile for controlling the speed of rotation of said kicker wheel portions in coordination with the speed of the vehicle, said speed control means being coordinated with the speed control means of the vehicle.

8. The system of claim 1, wherein said body is a flat plate at least generally vertically disposed having a series of angularly disposed edges spaced about its periphery forming a star wheel, said edges having lateral extensions at least at its terminal, peripheral tips to form said laterally extending members.

9. The system of claim 8, wherein said laterally extending members are a series of laterally disposed plates fixed to said angularly disposed edges.

10. A piler system which push-piles sugar cane or the like for loading, comprising:
(a) a motorized vehicle used for loading sugar cane or the like having a frame; and
(b) piler means attached to said frame for push-piling and rolling the cane in front of said vehicle, said piler means including:
  (i) a push piler assembly, and
  (ii) at least two, spaced, rotatable, kicker wheel portions associated with said piler assembly, each of said kicker wheel portions comprising a rotating support body upon which are supported a series of laterally extending members, said body being a flat plate at least generally vertically disposed having a series of angularly disposed edges located about its periphery, and said laterally extending members being a series of laterally disposed plates fixed to said angularly disposed edges, the rotation of said kicker wheel portions causing a lifting and beating action on the cane as it is being push-piled to better form a larger pile of cane and to dislodge dirt, mud, and other foreign matter from the pile of cane.

11. The system of claim 10, wherein said kicker wheel portions are comprised of two, separate kicker wheels, each one being mounted outboard on opposite sides of said push piler assembly.

12. The system of claim 10, wherein the rotational speed(s) of said kicker wheel portions is adjustable relative to the forward speed of said vehicle.

13. The system of claim 10, wherein said rotatable kicker wheel portions rotate about fixed but adjustable points.

14. The system of claim 10, wherein said kicker wheel portions are rotated in a direction opposite to the wheels of said vehicle and wherein the linear, peripheral speed of said kicker wheel portions is greater than the ground speed of said vehicle.

15. The system of claim 10, wherein there is further included speed control means associated with said kicker wheel portions and the speed control for the vehcile for controlling the speed of rotation of said kicker wheel portions in coordination with the speed of the vehicle, said speed control means being coordinated with the speed control means of the vehicle.

16. A method of improving the piling action of a sugar cane vehicle having a piler assembly which push-piles sugar cane or the like for loading, comprising the following steps:
(a) providing at least two, spaced, rigid, rotatable, kicker wheel portions having laterally extended tips for association with and positioning adjacent to the piler assembly for contacting the push-piled cane with the laterally extended peripheral edges of said kicker wheel portions;
(b) rotating said kicker wheel portions with the laterally extended tips hitting the cane causing a lifting and beating action on the cane as it is being push-piled to better form a larger pile of cane and to dislodge dirt, mud, and other foreign matter from the pile of cane.

17. The method of claim 16, wherein step "b" further includes the step of:
rotating said kicker wheel portions in a direction of rotation opposite to that of the wheels of the vehicle and at a linear, peripheral speed at least a little bit greater than that of the ground speed of the vehicle.

* * * * *